United States Patent [19]

Dolan et al.

[11] Patent Number: 4,466,423
[45] Date of Patent: Aug. 21, 1984

[54] RIM-DRIVE CABLE-ALIGNED HELIOSTAT COLLECTOR SYSTEM

[75] Inventors: James E. Dolan, Denver, Colo.; Timothy D. Sands, Berkeley, Calif.

[73] Assignee: The United States of America as represented by the United States Department of Energy, Washington, D.C.

[21] Appl. No.: 429,923

[22] Filed: Sep. 30, 1982

[51] Int. Cl.³ .............................................. F23J 3/02
[52] U.S. Cl. .................................. 126/424; 126/438; 126/425; 353/3; 350/289
[58] Field of Search ...................... 126/438, 425, 424; 353/3; 350/289, 288

[56] References Cited

U.S. PATENT DOCUMENTS

| | | |
|---|---|---|
| 1,111,239 | 9/1914 | Smelser . |
| 1,951,404 | 3/1934 | Goddard . |
| 3,174,397 | 3/1965 | Sanborn ............................ 350/292 |
| 3,924,604 | 12/1975 | Anderson . |
| 3,982,526 | 9/1976 | Barak . |
| 4,044,752 | 8/1977 | Barak . |
| 4,056,313 | 11/1977 | Arbogast . |
| 4,110,010 | 8/1978 | Hilton ............................... 350/292 |
| 4,114,594 | 9/1978 | Meyer ............................... 126/424 |
| 4,134,387 | 1/1979 | Turnstrom . |
| 4,251,135 | 2/1981 | Stone . |
| 4,252,107 | 2/1981 | Horton ........................... 350/289 X |

Primary Examiner—Larry Jones
Attorney, Agent, or Firm—Kenneth L. Richardson; Sandra B. Weiss; Michael F. Esposito

[57] ABSTRACT

Disclosed is a heliostat collector apparatus comprising at least one heliostat suspended from a plurality of longitudinally extending linkage means. An enclosure structure is disposed adjacent the heliostat and provides a means for allowing the heliostat to be substantially protected from weathering. A first drive means is operatively connected to the heliostat to effect steering thereof in at least one of first and second predetermined directions. Finally, a frame member is adapted for supporting the heliostat at an inner portion thereof. The frame includes a plurality of outer expandable portions. Each one of the expandable portions is adapted to slidably engage a corresponding one of the plurality of linkage means. The expandable portions are further adapted to allow the heliostat to be slidably moved along the linkage means in directions away from and towards the enclosure structure and to substantially reduce stress acting on the heliostat during steering.

30 Claims, 9 Drawing Figures

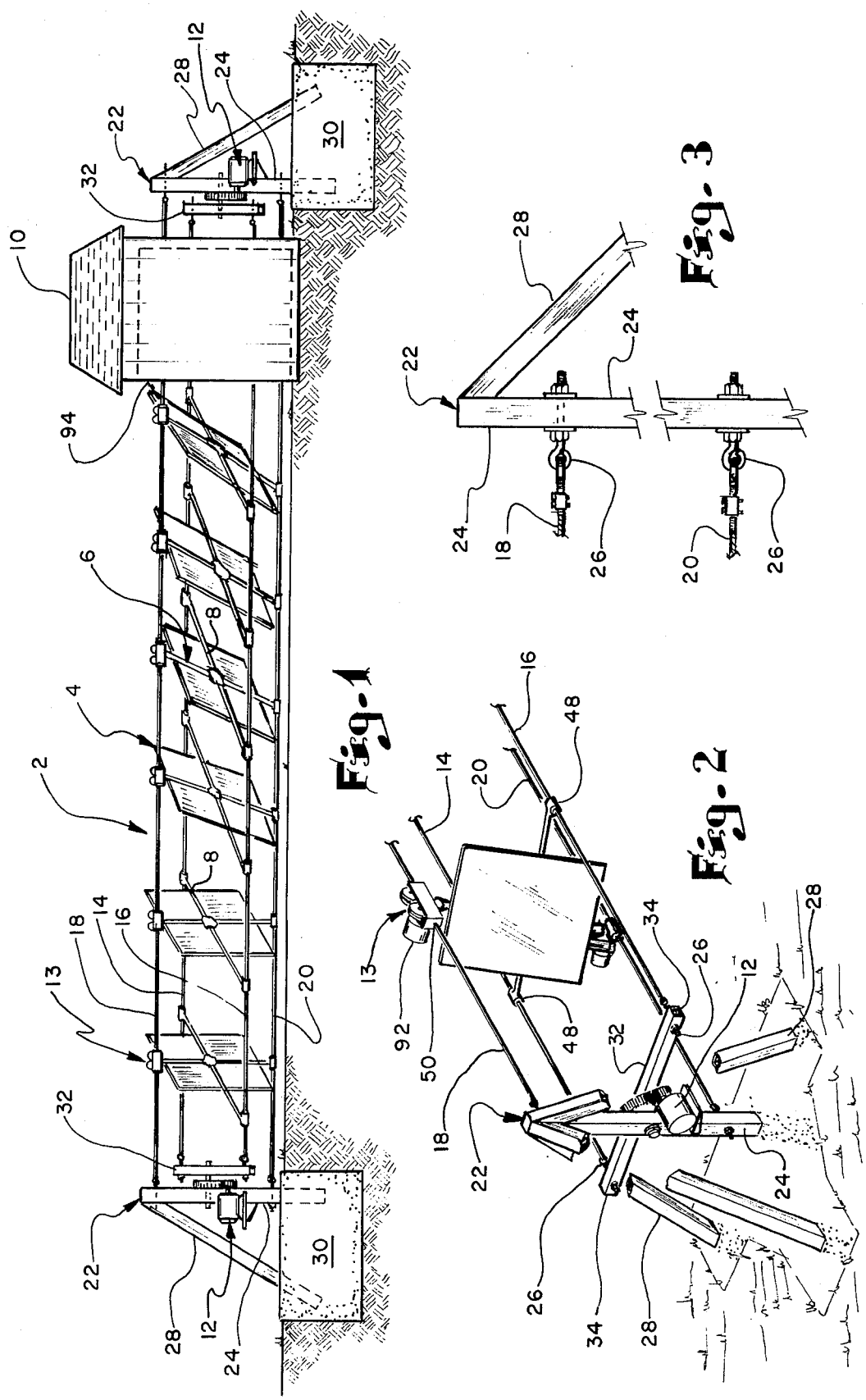

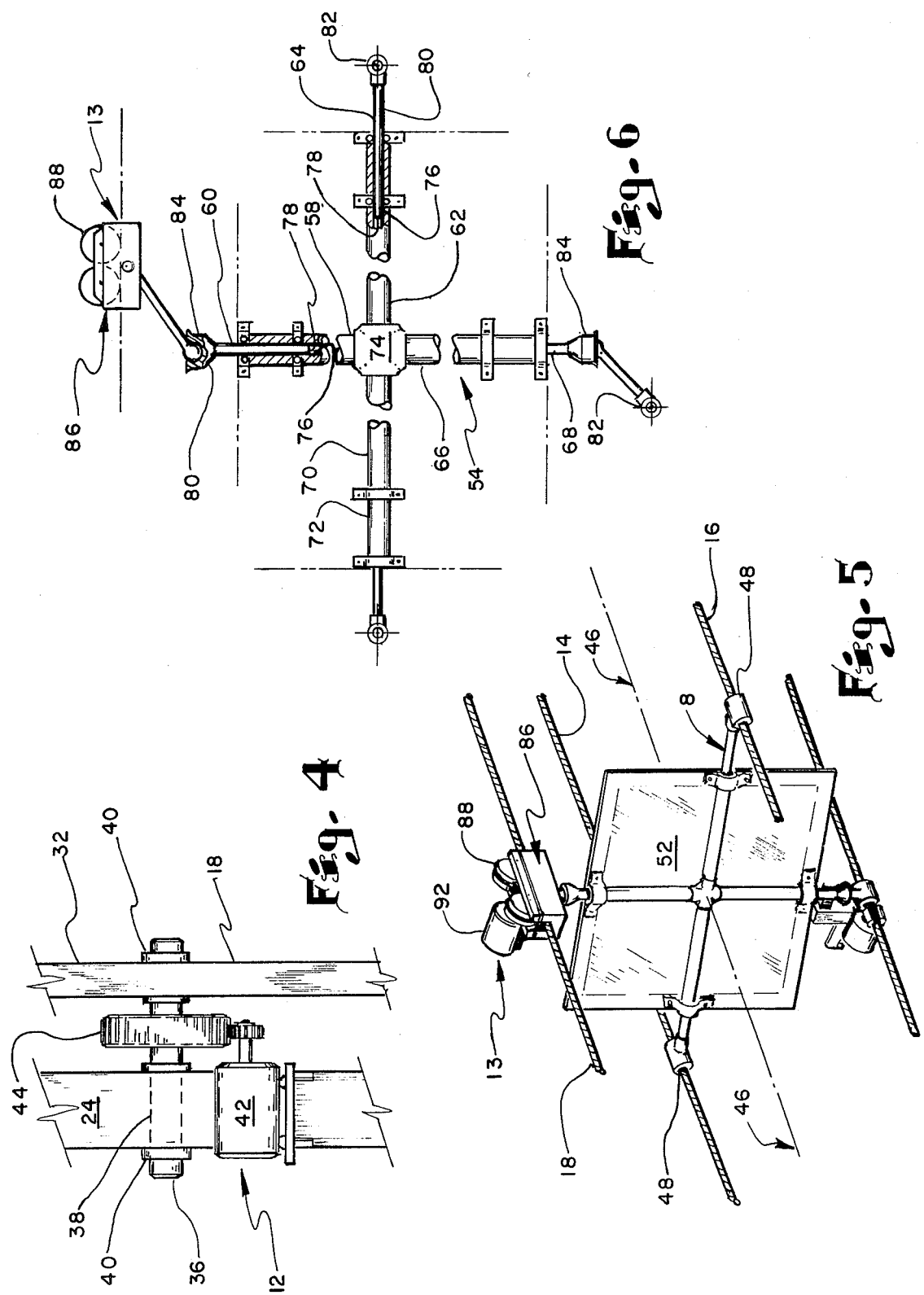

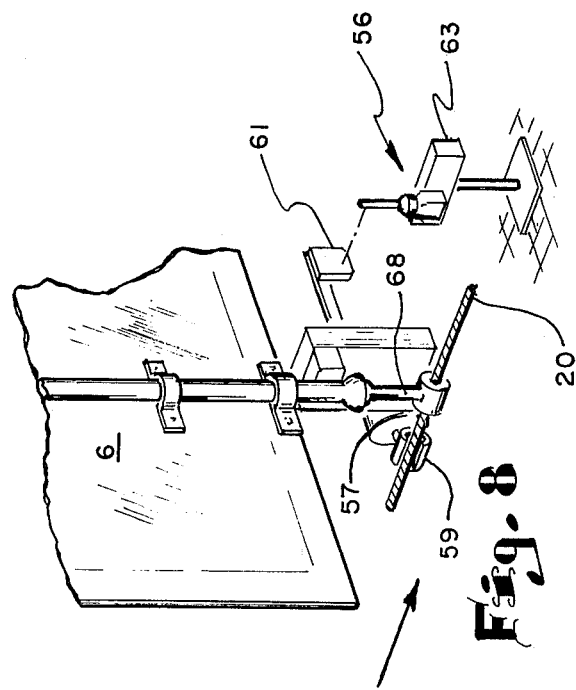
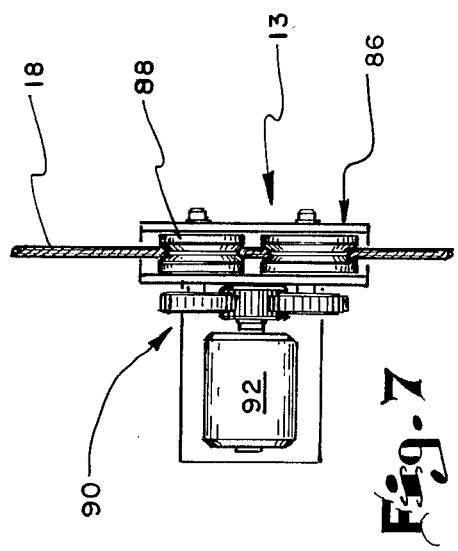
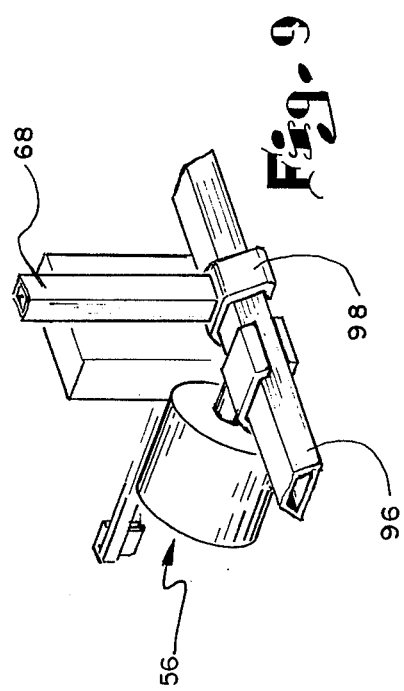

RIM-DRIVE CABLE-ALIGNED HELIOSTAT COLLECTOR SYSTEM

CONTRACTUAL ORIGIN OF THE INVENTION

The U.S. Government has rights in this invention pursuant to Contract No. EG-77-C-01-4042 between the U.S. Department of Energy and the Midwest Research Institute.

BACKGROUND OF THE INVENTION

1. Field of the Invention

The invention relates generally to solar energy collector systems and pertains, more specifically, to a rim-drive cable-aligned heliostat collector system.

2. Description of the Prior Art

New developments in the solar thermal power station art include a recent trend to design and produce an economically viable alternative to conventional commercial electrical power generating facilities. To become a viable alternative, power stations must be capable of producing electrical power in the megawatt range. From this recent trend, central-receiver tower-power systems have emerged as one of the leading alternatives among the different solar power systems for generating electricity in the megawatt range.

To provide power in the megawatt range, central-receiver tower systems usually include an array of hundreds or even thousands of individually steered flat reflectors or mirrors and a central receiver on top of a tower. Such arrays are normally referred to as a heliostat field, while the individual reflectors are normally referred to as heliostats. The heliostat field redirects radiant solar energy to the receiver. The receiver collects and converts the radiant solar energy to thermal energy which is then normally used to drive a turbine generator for electrical power generation.

It will be appreciated that the structure of most heliostats fields is fairly complex. Thus, to fully understand the novel aspects of the present invention and the numerous advantages flowing therefrom, the general structure of the individual heliostats will necessarily briefly be described. Each individual heliostat generally includes a reflective panel, a foundation, trenching, and a two-axes tracking system. The reflector panel generally includes a reflector and a lattice-type metal reflector support frame by which the reflector is mounted. The reflector is usually in the form of a mirror module which comprises a plurality of laminated silvered-type mirrors.

The reflector panel is usually supported by a metal constructed tubular-shaped pedestal which elevates the heliostat to a desired vertical distance from the land surface. The foundation is usually formed from steel reinforced concrete and is employed to anchor the pedestal to the ground through the trenching.

The two-axes tracking system provides each heliostat with the proper orientation and normally includes a heliostat array controller that interfaces with a heliostat controller and a dual drive/motor sensor system. Both controllers usually comprise microprocessor-based units.

The heliostat array controller usually responds to commands from the heliostat controller and sends information to the heliostat controller. It also calculates commands for giving each heliostat its orientation through the drive/motor sensor system. Preprogrammed algorithms typically are used to affect orientation. Heliostat electronics convey signals between the data control network and the various heliostats.

Although tower power systems as aforedescribed have presently emerged as a viable alternative for commercially generating electrical power in the megawatt range, several major problems and concerns include firstly, the high cost associated with producing the heliostat field; secondly, the high cost associated with producing many of the components of the individual heliostats; thirdly, degradation and failure of the reflector panel due to weathering; and lastly, cleaning and maintenance techniques.

The concerns and problems centering around high production costs exist because, generally speaking, the cost of producing a heliostat field accounts for about 50%–60% of the total investment cost of the tower power system. This high cost for producing heliostat fields is in part due to the need to provide very accurate, complex and expensive two-axes tracking components on the hundreds of heliostats comprising the field. For example, in nearly all tower systems almost every single heliostat in the field requires at least two fairly expensive drive motors, one for rotating the heliostat reflector panel about the elevational axis and the other for rotating the heliostat reflector panel about the azimuthal axis.

The aforesaid high production cost is also in part due to the need to provide all of the aforesaid numerous heliostats with steel pedestals and reinforced steel concrete foundations. Generally speaking, these foundations and pedestals frequently account for as much as 13% of the cost to produce each individual heliostat. From the aforegoing, it can thus be seen that there is a need to lower the total investment cost of tower power systems in order to improve the attractiveness of tower systems as an alternative source of electrical power generation. Significantly, this need can be met by devising a two-axis tracking system, wherein the high cost associated with the two drive/motor components and the pedestal and foundation components is substantially reduced.

The concerns centering around the reflector panel exist because heliostats should have an operational life of around 30 years to be effective for commercial electrical power generation. Unfortunately, however, most panels are continuously exposed to adverse weathering, such as for example, sandstorms, hailstorms, wind storms, dust storms, lightening, and ice/snow load for the entire operating life thereof. Such weathering frequently prematurely destroys the heliostats by causing either substantial degradation of the reflective surface of the reflectors or by causing corrosion and failure of the reflector frames.

Degradation of the reflective surface, for example, usually results in optical reflectivity/specularity losses. Generally speaking, reflectivity is associated with the reflector material and the spectral variation in the absorption of radiant energy. Specularity is associated with the degree of scattering in light rays with respect to the reflector surface finish in flatness. Specularity is particularly significant in heliostat applications which rely on redirecting the radiant energy over long distances with minimal scattering. Consequently, when degradation causes the reflectivity and specularity to fall below desired values, the reflector must be either repaired or discarded and replaced.

Specifically speaking, substantial degradation of the reflector surface which leads to replacement of the heliostat occurs in many ways. For example, when the silvered reflector surfaces are exposed to precipitates of moisture such as salt and hydrogen sulfide, the precipitates frequently act adversely to irreversibly impair its optical reflectivity/specularity properties.

In another example, many steel reflector frames under atmospheric exposure produce a thin adherent surface layer of iron oxide as a corrosion product. When rain water washes over the oxidized steel surfaces, wets adjacent reflector surfaces, and subsequently dries thereon by evaporation, the iron oxide residue thereof stains the reflector surface. Such stains may also adversely affect reflectivity. Additionally, in those instances where it is still possible to clean the stained surface, the stains normally can only be removed through timely abrasive scrubbing or acid dissolution cleaning techniques.

Similarly, wind born particles such as sand often abraid the reflector surfaces or may even be deposited thereon. Such abrasion and deposits also adversely act to reduce reflectivity. Moreover, in those instances where it is still possible to clean the surfaces, such deposits often become difficult-to-remove contaminants or a source of unwanted staining.

With respect to failure of the reflector frame, ice/snow loads and wind loads on both the reflector and the reflector frame may cause fracture thereof, which may eventually lead to failure. Similarly, the impact of hail and other wind blown particles on the reflector and the reflector frame may also cause fracture thereof and eventual failure. Additionally, extreme temperature changes frequently cause permanent deformation and warping of the reflector frames, which again may also lead to fracture and eventual failure thereof. The concerns regarding degradation and failure of the reflector panel become even more acute when it is remembered that in large power systems hundreds of heliostats usually are involved.

Reflector cleaning methods are an area of concern in tower systems because numerous heliostats must be routinely cleaned, as well as repaired, to maintain heliostat field efficiency. However, the task of cleaning these heliostats is normally rather time consuming. In fact, generally speaking, the major cost of cleaning heliostats is directly related to the cleaning task time rather than to the method of cleaning. Thus, there is a current need to reduce the task time to an acceptable level in order to make the cleaning technique cost-effective on a commercial scale of operations.

To cope with the aforesaid problems and concerns, the two-axes tracing systems of some heliostats have been designed to integrate the components of the tracking system so as to reduce the number of components and thus minimize related material and labor costs. For example, considerable progress has been made in reducing the number of heliostat controllers and associated cable runs. Unfortunately, however, these integrated component-type designs as well as other prior art designs suffer from one or more disadvantages and shortcomings. For instance, in the aforesaid designs, nearly all of the tracking systems still require two fairly expensive drive/motor sensor components for each heliostat.

Some existing designs allow for the reflector panel to be rotated in an inverted or horizontal position, whereby the reflector surface is caused to face the ground to protect it from sand, hail and other harmful windblown particles. However, in these designs, the reflector panels are subject to deformation, fracture and eventual failure due to dead weight loads and ice/snow loads acting on the upward-facing frame side thereof.

In an attempt to prolong the operating life of the heliostats, some heliostat designs use fairly low-cost plastic materials to provide barrier coats and base coats to protect the reflectors from harmful precipitates and the like. However, in those cases where the heliostat reflectors are in the form of mold-in laminated-silvered or aluminized-films with molded or extruded plastic substrates, the process used to produce such reflectors is usually costly and often presents problems with adhesion. Additionally, the metallized-films of these reflectors often do not perform well. Moreover, in those cases where the heliostat reflectors are in the form of a silvered or aluminized-film laminated to a metallic or nonmetallic facing sheet, the surface finish of the molded laminate is often inadequate as a specular substrate.

Some heliostat designs have employed additional metal constructed stiffeners to strengthen the reflector frames in order to enable the reflector panels to more easily withstand the combined effects of wind, temperature and gravity loads. However, such stiffeners frequently increase the dead weight load of the entire panel, thereby also frequently increasing the potential for warping, fracture and eventual failure of the panel.

Some cleaning and maintenance procedures utilize a spray-soak technique to clean the heliostat. In this technique, a first truck is employed to spray a soak, clean and rinse-type of wash solution on the heliostat and a second truck is employed to spray-rinse the soaked heliostat. Unfortunately, however, the task of driving these trucks through a large heliostat field and cleaning hundreds of reflectors therein is repetitive to the point of boredom. As a consequence, inattentiveness of maintenance men during cleaning often leads to accidental damage to the heliostats with the trucks.

In an attempt to prevent such accidental damage, some cleaning and maintenance procedures employ mechanical scrubbers to clean the heliostats. However, this latter procedure requires the use of numerous scrubbing machines and a position and steering system for locating these machines near the heliostat.

One unique solution to the aforesaid problems utilizes a plurality of solar collectors in a rim-drive tracking system. The rim-drive tracking system provides an apparatus for suspending a plurality of solar collectors from a plurality of cables. Suspending the collectors from cables allows the number of required pedestal and foundation components to be reduced in a manner somewhat similar to that taught in applicant's present application hereinafter. This earlier rim-drive type of tracking system is described in U.S. Ser. No. 192,799, filed Oct. 1, 1980 and assigned to the same assignee as the present application, and which is incorporated herein by reference.

Notably, however, this earlier rim-drive tracking system does not describe a stowage technique for satisfactorily protecting the heliostats from weathering as is disclosed herein. It also does not disclose a heliostat frame which functions to substantially reduce heliostat stress during steering, nor does it describe a motor/drive system for steering as described hereinafter.

SUMMARY OF THE INVENTION

Against the foregoing background, it is a general object of the present invention to provide an improved heliostat collector system which overcomes many of the aforedescribed shortcomings and disadvantages of prior art heliostat systems.

It is another object to provide a long-life low-cost heliostat system which in certain embodiments is mass producible using only off-the-shelf commercial components.

It is yet another object to provide a rim-drive heliostat collector system for the use with both a solar thermal central-receiver tower-power system and a solar thermal central-receiver point-focus power system.

It is a more specific object to substantially reduce stress on heliostats employed in a rim-drive heliostat tracking system produced from twisting and turning moments acting thereon during heliostat steering in the elevational and azimuthal directions.

It is yet another specific object to substantially reduce the number of drive motors usually required in the two-axes tracking system.

It is still another specific object to substantially reduce the number of pedestals and associated foundations normally required to support the heliostat reflectors in a heliostat field.

It is a further specific object to provide an improved stowage technique for protecting the heliostat array from weathering.

The above objects, as well as still further objects and advantages, are attained by the present invention by providing a heliostat collector apparatus having at least one heliostat suspended from a plurality of longitudinally extending linkage means. An enclosure structure is disposed adjacent the heliostat and provides a means for allowing the heliostat to be substantially protected from weathering. A first drive means is operatively connected to the heliostat to effect steering of the heliostat in at least one of first and second predetermined directions. Finally, a frame member is provided for supporting the heliostat at an inner portion thereof, the frame member having a plurality of outer expandable portions with each one of the expandable portions being adapted to slidably engage a corresponding one of the plurality of linkage means. The expandable portions are adapted to allow the heliostat to be slidably moved along the linkage means in directions away from and toward the enclosure structure and to substantially reduce stress acting on the heliostat during steering.

Additional objects, advantages, and novel features of the present invention will be set forth in part in the detailed description which follows, and in part will become apparent to those skilled in the art upon examination of the following description or upon practicing the invention. The objects and advantages of the invention may be realized and attained by means of the elements and the combination of elements particularly pointed out in the appended claims.

BRIEF DESCRIPTION OF THE DRAWINGS

The accompanying drawings, which are incorporated in and form a part of the specification illustrates preferred embodiments of the present invention and together with the description serve to explain the principles of the invention. In the drawings:

FIG. 1 is a plan view of a rim-drive heliostat collector system constructed in accordance with the invention.

FIG. 2 is partly broken, enlarged detailed perspective view of a mast member and azimuthal drive motor of the heliostat collector system of FIG. 1.

FIG. 3 is a partly broken, enlarged detailed side view of the connection between some of the cables and a mast member of the heliostat collector system of FIG. 1.

FIG. 4 is a partly broken, enlarged side view of the azimuthal motor and cross-member drive shaft of the heliostat collector system of FIG. 1.

FIG. 5 is a partly broken, enlarged perspective view of a heliostat connected to the rim-drive component of the heliostat collector system of FIG. 1.

FIG. 6 is a partly broken, partly sectioned, enlarged detailed view of a reflector frame of the heliostat collector system of FIG. 1.

FIG. 7 is a partly broken, enlarged detailed view of an elevational drive motor of the heliostat collector system of FIG. 1.

FIG. 8 is a partly broken, enlarged detailed perspective view of a switching component of the heliostat collector system of FIG. 1.

FIG. 9 is a partly broken, enlarged detailed perspective view illustrating an alternate embodiment of one of the linkage means of the heliostat collector system of FIG. 1.

DETAILED DESCRIPTION OF THE PREFERRED EMBODIMENTS

Referring now to the drawings, and especially to FIGS. 1 through 4, a heliostat collector system 2 constructed in accordance with the invention is illustrated for use with a solar thermal power station (not shown). Power stations contemplated for use with the present invention comprise, for example, both kilowatt and megawatt point-focus central-receiver power stations and line-focus central-receiver power stations. It should be understood, however, that the present invention is not limited to use with central-receiver-type power stations. The inventive concepts set forth herein can be readily adapted to cope with heliostat problems associated with solar energy conversion in general, as those skilled in the art will recognize in the light of the present disclosure.

The basic components of heliostat collector system 2 generally comprise a rim-drive-type tracking apparatus 4, a plurality of heliostat collectors 6, a plurality of heliostat reflector support frames 8, an enclosure structure 10, and a heliostat drive system. The heliostat drive system includes two separate drive assemblies which are generally denoted by the reference characters 12, 13.

Rim-drive apparatus 4 generally provides a means for establishing a heliostat field and includes a plurality of longitudinally extending flexible linkage means. In a preferred construction, the linkage means includes four cables 14, 16, 18, 20, which are suspended and stretched between a pair of longitudinally spaced mast members 22. Each one of the two mast members 22 preferably comprises an elongated metal constructed generally verticle extending structural member 24 for supporting the cables 18, 20 at vertically spaced portions thereof, as is clearly shown in FIG. 3. Conventional fasteners 26, such as for example clevises, may be utilized to connect the terminal ends of the cables 18, 20 to the verticle members 24.

In the present instance, each one of the two verticle members 24 is stiffened with a plurality of metal constructed diagonally positioned structural members 28 that tie into an upper portion thereof through a weld or through suitable fasteners. The diagonal members 28 and the verticle members 24 of each one of the two mast members 22 are anchored to the ground through a fairly rigid foundation 30. Each foundation 30 is of a suitable strength to prevent overturning of its associated mast member 22 under most normal anticipated operating conditions. Each verticle member 24 also supports an elongated motor-driven cross structural member 32 intermediate the two opposing ends 34, 36 thereof.

The cross members 32 are part of the drive assembly 12 and generally function to support the cables 14, 16 and to provide circular movements to the cables 14, 16 relative to the two remaining cables 18, 20 and the mast members 22. To achieve such cable support, the terminal ends of the cables 14, 16 are connected to the outer ends portions 34 of the cross members 32 with fasteners 26, as is clearly shown in FIG. 2. To accomplish providing circular movement to the cables 14, 16, each one of the two cross members 32 is pivotally connected to the vertical member 24 associated therewith through a drive shaft 36 in a manner to allow rotational movement of the cross member 32, as is most clearly shown in FIG. 4.

In this pivotal connection, each one of the two drive shafts 36 is seated within a transverse extending bore 38 in each vertical member 24 and is supported by radial bearings (not illustrated) thereat. Conventional fasteners 40, such as for example a collar and pin arrangement, are used to secure the drive shafts 36 in the vertical member 24 and the cross member 32. Each cross member 32 is driven by an azimuthal drive motor 42, which is also part of the drive assembly 12, through a gear train 44 fitted to the drive shaft 36 and the shaft of a motor 42. Each motor 42 functions to rotate or steer the heliostats 6 about an azimuthal axis through circular displacement of the cables 14, 16. Additionally, each motor 42 is adapted to interface with a conventional heliostat computer control system (not shown) in a well-known manner such that it operates under control software direction.

It will be appreciated that the specific details of the heliostat computer control system have been omitted from the drawing for the sake of clarity since such details are well known in the heliostat control art and form no part of the specific invention. Even so, it will also be appreciated that the type of computer control system to be used with collector system 2 will preferably include commercially available computer hardware. Such hardware will be a type suitable for interfacing with drive motors 42 and gear trains 44 through heliostat sensors and associated control electronics and other required peripheral components thereof so as to provide motors 42 with command signals to effect precise automatic displacement of heliostats 6. Noteably, such control systems typically provide first commands which cause all the heliostats to do the same thing and second commands which cause only a fraction of the heliostat array or even a single heliostat to do a desired thing.

Rim-drive apparatus 4 further comprises a plurality or row of axially aligned, generally parallel, longitudinally spaced heliostats 6 arranged in registry. By this row-type of arrangement, the cables 14, 16, 18, 20 suspend the heliostats 6 from the rims of their frames 8 in a manner to define a first imaginary longitudinally extending center line passing therethrough. This first center line is coincident with a second imaginary center line. The second center line is defined by the symetrical arrangement of the longitudinally extending cables 14, 16, 18, 20. Both the first and second center lines are generally denoted by the reference character 46 (see FIG. 5). Additionally, by this row-type arrangement it will be also noted that the cables 14, 16 connect to the heliostats 6 at azimuthal attachment points 48 so as to provide the heliostats 6 with an azimuthal axis of rotation. Similarly, the cables 18, 20 connect to the heliostats 6 at elevational attachment points 50 so as to provide the heliostats 6 with an elevational axis of rotation, as will be more fully explained hereinafter.

The number of heliostats 6 utilized with the rim-drive apparatus 4 depends upon numerous factors, such as for example, the size or electrical power range of the solar thermal power station, the size of the heliostat field or land area, the type of terrain on which the heliostats will be positioned, the size of the individual heliostats, the climate of the area at which the heliostat field will occupy to name only a few. However, in the present instance, rim-drive apparatus preferably comprises at least around about seven heliostats.

Referring now to FIGS. 5–8 and especially to FIG. 5, in keeping with the invention, each heliostat 6 includes a heliostat reflector 52 and a heliostat frame 8 as previously mentioned. In the present instance, each reflector 52 comprises a lightweight type of reflecting unit which is bonded to the reflector frame 8. Lightweight heliostat reflectors are well known. Lightweight heliostat reflectors, generally speaking, are formed from materials which weigh substantially less than the average weight of materials normally employed to form silvered mirror-type heliostats. It will be understood, however, that the present invention is not necessarily limited to use with lightweight-type heliostats. The inventive concepts set forth herein can be readily adapted to employ non-lightweight-type heliostats, as those skilled in the art will recognize in the light of the present disclosure.

Each heliostat frame 8 generally functions as previously mentioned to attach the reflector 52 thereof to the cables 14, 16, 18, 20 in a manner to allow both pivotal movement and sliding movement of the reflector 52 with respect to the aforesaid cables. In the present instance, each frame 8 is formed from a lightweight type of metal such as aluminum. Additionally, each frame 8 includes two elongated tubular structural members permanently tied in a cross-like configuration through a weld or some other suitable means so to define a plurality of circumferentially spaced radially projecting arm members, as is clearly seen in FIGS. 5 and 6. These arm members are generally denoted by the reference character 54. The frame 8 also includes a portion of the elevational drive assembly 13 and a switching component 56, as will be more fully explained hereinafter.

Speaking more specifically, with respect to the arms 54, the frame 8 defines four radially projecting arm members, as is best shown in FIG. 6. Each one of the four arm members include an inner portion and an outer expandable portion, the first arm member defining inner and outer portions 58, 60, respectively, the second arm portion defining inner and outer portions 62, 64, respectively, the third arm member defining inner and outer portions 66, 68, respectively, and the fourth and last outer portion defining inner and outer portions 70, 72, respectively. The inner arm portions 58, 62, 66, 70 project radially from a central region or point 74 and generally function to provide a bearing region for seating and supporting the associated reflector 52.

The outer expandable arm portions 60, 64, 68, 72 are adapted to releasably connect the associated heliostat 6 to corresponding ones of the four cables 14, 16, 18, 20. Stated differently, the aforesaid expanders arms are adapted to connect the associated heliostat 6 at the azimuthal and elevational attachment connection points 48, 50, respectively.

Noteably, the expanders 64, 72 are employed to connect the heliostat 6 to the azimuthal connection points 48, while the expanders 60, 68 are employed to connect the heliostats 6 to the elevational connection points 50. Additionally, the aforesaid expander arm portions 60, 64, 68, 72 are further adapted to provide both pivotal and slidable movement of the frame 8, and thus the reflector 52, with respect to the cables 14, 16, 18, 20. Each expander arm 60, 64, 68, 72 is also adapted to telescopically expand or move in a radial direction towards and away from the central region 74, relative to a corresponding one of the four inner arm portions 58, 62, 66, 70, and thus relative to the reflector 52 bonded thereto, in response to heliostat steering about the elevational and azimuthal axis.

To accomplish such radial movement, an outer portion of each inner arm 58, 62, 66, 70 is provided with an elongated generally cylindrically shaped recess 76. Additionally, each expander member 60, 64, 68, 72 is provided with a generally elongated cylindrical structure which defines first and second opposed ends 78, 80. The first end 78 of each expander arm is adapted to seat within a complementary recess 76 of a corresponding one of the four inner arms 58, 62, 66, 70 and to slidably move towards and away from the central hub-like region 74 in response to elevational and azimuthal steering.

To facilitate the sliding contact between the mating surfaces of the recess 76 and the first expander ends 78, each first expander end 78 is provided with suitable bearings and is also located within the recess 76 with a loose and running slide fit. It will be appreciated that the portion of each first expander end 78 which slidably mates with the recess 76 is provided with a suitable length to prevent disassembly thereof under substantially all normally anticipated heliostat steering conditions.

To accomplish the connection of the expander arms 64, 72 at azimuthal connection points 48 of cables 14, 16, respectively, in a releasable and slidable manner the second ends 80 of the expander members 64, 72 are preferably provided with a split bushing or some other equivalent conventional type of fastener suitable for achieving such connections. In this instance, the split bushings are provided with guide bearings to facilitate the sliding movement of the expander arms 64, 72. The split bushings and the guide bearings are both generally denoted by the reference numeral 82.

As a consequence of locating the drive assembly 13 at a desired one of the two remaining expanders arms 60, 68, it will be apparent that a somewhat different construction is employed to accomplish the connection of the expander arms 60, 68 to the elevational connection points 50 in a releasable and slidable manner. Referring initially to the construction of the expander arms 60 in explanation of such different structure, each second end 80 thereof is connected to the drive assembly 13 through a coupler member 84. Each drive assembly 13 generally functions to releasably and slidably connect the reflector 52 to the cable 18 as well as to rotate the reflector 52 associated therewith about its elevational axis in response to control software direction derived from the heliostat computer control system.

In the present instance, each drive assembly 13 comprises an overheadtraveling electrical trolley 86. The trolley 86 is of a well known type for moving a load vertically suspended therefrom in a fairly horizontal path with respect to ground and is adapted to support and to releasably connect the heliostat associated therewith to the cable 18. The trolley 86 includes a plurality of wheels 88, which wheels 88 bear directly on the cable 18 for moving the trolley 86 therealong. The wheels 88 are driven through a gear train 90 by an elevational drive motor 92 seated within a motor mount of the trolley 86. Each drive motor 92 is adapted in a well known manner via sensors thereof, as previously described, to interface with the heliostat control system so as to operate in response to commands therefrom.

The coupler 84, by which the trolley 86 and the second end 80 of the expander arm 60 are connected, generally functions to facilitate sliding movement of the trolley 86 along the cable 18. The coupler 84 may comprise any well known type of joint suitable for connecting two shaft-like members which are not in line with one another and which require pivotal movement therebetween. In the present instance, the coupler 84 consists of a ball and socket-type pivotal joint.

Referring now to the construction of the remaining expander arm 68, each first end 78 thereof is provided with a fastener 82 for connecting the associated reflector 52 to cable 20 in a releasable and slidable manner. Noteably, the fastener 82 is connected to the first expander end 78 through a coupler 84 as previously described.

Additionally, it will be noted that each expander arm 68 is associated with the switching component 56, as is best shown in FIGS. 5 and 8. By such an association, the switching component 56 functions to releasably lock expander arm 68 to the cable 20 in a manner to prevent longitudinal movement of the associated heliostat 6 along the cable 20 in response to heliostats being rotated about its elevational axis.

In the present instance, each switching component 56 comprises a solenoid member 57 and a moveable locking member 59 thereof, as well as a striker plate 61 and an electrical switch 63 for energizing solenoid 57. The solenoid 57, locking member 59 and striker plate 61 are mounted at a lower portion of arm 68 relative to the switch 63 supported thereunder by a brace member that is anchored to the ground, such that striker plate 61 is enabled to contact switch 63 upon rotating the associated heliostat 6 a predetermined amount in the elevational direction, by which solenoid 57 becomes energized.

In an energized state, the solenoid actuates its locking member which in turn functions to grab and lockingly restrain the expander arm 68 from longitudinal movement to and fro along the cable 20. When the solenoid 57 is in a degenerized state, the expander arm 68 is no longer restrained by the locking member, and thus is freely moveable along the cable 20, as will be more fully explained hereinafter.

Referring again to FIG. 7 and, to the enclosure structure 10, enclosure 10 generally functions to protect the heliostat array from adverse weather conditions and to provide an enclosed area for cleaning and maintaining the heliostats 6. The enclosure 10 preferably is in the form of a repair or stowage house. The house 10 is positioned adjacent one of the two mast members 22 and is of a suitable size and shape to fully enclose the entire heliostat array 6. It may also be of a size and shape to fully enclose one of the two remaining mast members 22. The house 10 is provided with an opening 94 for allowing the heliostats 6 to be moved longitudinally along the cables 14, 16, 18, 20 from a first position outside of the house 10 through the opening 94 to a second position inside of the house 10.

Referring again to the drive assemblies 12, 13, it will now be apparent in view of the aforesaid that the drive assembly 12, and thus the two-axes drive system of the present invention, requires only two azimuthal-type drive motors 42 to steer the entire heliostat array 6 about the azimuthal axes. It will also be apparent that the drive assembly 13 requires a plurality of fairly inexpensive-type elevational drive motors 92 to steer each heliostat 6 about its elevation axis, that is to say, one motor 92 for each heliostat 6 of the array.

In carrying out the invention, it will be understood that the heliostat collector system 2 generally operates in two basic modes, which are a first tracking mode and a second maintenance or stow mode. In the stow mode of operation, the heliostat collector system 2 is generally shut down. When shut down, its beam is no longer focused on the central receiver. Both the beam and the central receiver are not illustrated herein for the sake of clarity and brevity. Additionally, all the electronics and electrical systems associated with the drive motor components and the computer control components are normally de-energized when the system 2 is shut down, and the heliostats 6 are stowed in the house 10. Shutdown, for example, is normally executed at sunset or at the incipience of unsafe weather conditions.

In the tracking mode of operation, the heliostat collector system 2 generally functions to track the sun and to redirect sun radiation by reflection to the central receiver. During tracking, the azimuthal drive motor 42 functions to simultaneously or individually steer the heliostats 6 above their elevational axes.

In the normal sequence of operationl steps, the heliostat collector system 2 is initially in the stow mode of operation prior to the tracking mode of operation. Upon putting the heliostat system 2 in the stow mode of operation, as well in the tracking mode of operation, the fasteners 82, the trolleys 86 and the switches 56 function to allow each heliostat 6 to be moved in a longitudinal direction along the cables 14, 16, 18, 20. It will be appreciated that electrical or manual means may be employed in a well known manner to move all or any portion of the heliostat array 6 into the enclosure 10 and that the enclosure 10 protects the stored heliostats 6 from adverse weather conditions, as well as providing a sheltered area to effect cleaning and maintenance tasks.

To put the heliostat collector system 2 in the tracking mode of operation, electrical power is applied thereto, the heliostats 6 are moved out of the enclosure 10, and the array thereof is initially aligned to reflect the sun's image onto the central receiver. When properly aligned, each individual heliostat 6 will accurately track the sun, such that the solar image is on its nominal aimpoint each day of the year from sunrise to sunset, as will be more fully explained hereinafter.

In view of the aforesaid, it may now be appreciated that during steering, the cables 16, 18 are connected between the cross members 32 and to the heliostats 6 in a manner to form a cable control loop at the azimuthal attachment points 48. This cable control loop substantially assists the azimuthal drive motors 42 in steering the heliostats 6 in the azimuthal direction. Likewise, it will be further appreciated that the cables 18, 20 are connected between the two mast members 22 and to the heliostats 6 at elevational attachment points 50 such that they function as control or guide cables. In this function, the cable 18 provides a sort of fixed horizontal path or tracking upon which the trolleys 86 longitudinally move to effect elevational steering. Moreover, it will be even further appreciated that the connection between the cable 20 and each coupler 84 provides a pivot point at the elevational attachment point 50 at which each heliostat 6 is rotated thereabout.

During the rotation of the heliostats 6 about both the elevational and azimuthal axes, each set of expander arms 60, 64, 68, 70 of each heliostat 6 function to substantially reduce heliostat reflector stress produced by turning and twisting moments acting thereon. In reducing this stress, the expander arms 60, 64, 68, 72 move in radial directions relative to corresponding ones of the inner arms 58, 62, 66, 70 towards and away from the center frame region 74 in response to heliostat steering, as previously mentioned. Such radial movement during steering allows each inner frame portion 58, 62, 66 and 70 and the reflector 52 associated therewith to be rotated about an imaginary center point defined by the junction of the center lines 47 and the central frame region 74. Rotation about this center point allows the set of expanders arms 60, 64, 68 and 72 to absorb or to transmit the cable twisting loads from the reflector.

Although the manner in which heliostat collector system 2 is aligned is not part of the present invention, it will nevertheless be briefly described. Referring initially to the alignment of the heliostats 6 with respect to the tracking azimuthal angle, the middle heliostat of the array is first rotated to set the correct azimuthal angle for tracking and beaming of the sun's image. To set the azimuthal angle, the motors 42 are commanded through an alignment sequence established in software to rotate both mast members 22 in a same first direction by the same amount until the middle heliostat correctly reflects the sun's image on the target receiver. Thereafter, one of the two opposed end heliostats is aligned to correct for differences in the azimuthal angle. Next, motors 42 are commanded to rotate the mast members 22 in a second opposite direction by the same amount until a selected one of the two end heliostats is aligned. Once the middle heliostat and the selected end heliostat are aligned, all of the remaining heliostats 6 will also be substantially aligned because the azimuthal angle changes monotonically along the heliostat array 6.

To accomplish alignment of the heliostat collector system 2 with respect to the tracking elevational angle, each heliostat 6 or some fraction of the array is commanded to rotate in a desired sequence through the drive assembly 13 to track and beam the sun's image unto the target receiver.

In view of the aforesaid, it is now apparent that the present heliostat collector system 2 has several advantages over prior art heliostat field systems in that: the number of azimuthal drive motors heretofore required to rotate the heliostat about their elevational axis has been substantially reduced; the number of pedestals and associated foundations heretofore required to support individual heliostats has been substantially reduced; and the procedure for stowing the heliostats during adverse weather conditions has been substantially improved, which improvement consequently prolongs the operating lives of the heliostats.

It will also be apparent that various changes and modifications to the particularly disclosed embodiments will be apparent to those skilled in the art and may be made without departing from the spirit and scope of the invention. By way of example, there is illustrated in FIG. 9 a variant of the embodiment of FIG. 1. The difference between the embodiments of FIG. 1 and FIG. 9 is that in FIG. 9 the lower linkage means, denoted in this instance by the reference character 96, comprises a metal constructed rail for adding rigidity and strength to the rim-drive system. In this regard, each expander arm 68 is also different in that it is provided with a bifurcated member 98 which is adapted for slidably connecting the associated reflector 52 to rail 96. It should be understood that the variant of FIG. 9 is not limited for use only with a bifurcated member. Nor is it limited to only replacing the bottom cable with a rail member, and that other means for slidably connecting the reflector to the rail and other cables may be replaced with rigid linkage means, as will occur to those skilled in the art.

The foregoing is considered as illustrative only of the principles of the invention. Further, since numerous modifications and changes will readily occur to those skilled in the art, it is not desired to limit the invention to the exact construction and operations shown and described, and accordingly all suitable modifications and equivalents may be resorted to, falling within the scope of the invention as defined by the claims which follow.

The embodiments of the invention in which an exclusive property or privilege is claimed are defined as follows:

1. A heliostat collector apparatus comprising:
   (a) at least one heliostat suspended from a plurality of longitudinally extending linkage means;
   (b) an enclosure structure disposed adjacent said at least one heliostat, said enclosure structure providing a means for allowing said heliostat to be substantially protected from weathering;
   (c) a first drive means operatively connected to said at least one heliostat to effect steering of said heliostat in a first of the two predetermined directions; and
   (d) a frame member adapted for supporting said heliostat at an inner portion thereof, said frame member having a plurality of outer expandable portions with each one of said expandable portions being slidably engageable with a corresponding one of said plurality of linkage means, said expandable portions being adapted to allow said heliostat to be moved along said linkage means in directions away from and towards said enclosure structure and to substantially reduce stress acting on said heliostat during said steering.

2. A heliostat apparatus as recited in claim 1, wherein each one of said expandable portions defines a peripheral end, said peripheral ends being adapted to releasably and slidably engage said corresponding one of said linkage means, and wherein said expandable portions are further adapted to move relative to said inner portions of said frame in response to said steering of said heliostat so as to reduce said stress.

3. A heliostat apparatus as recited in claim 2, wherein said at least one heliostat is suspended from said plurality of linkage means in a manner to define a first longitudinally extending center line, said first center line being coincident with a second longitudinally extending center line, said second longitudinally extending center line being defined by a symmetrical arrangement of said longitudinally extending linkage means, and wherein said plurality of expander portions are adapted to allow said heliostat to rotate about a fixed center point defined by said center lines passing through said heliostat in response to said heliostat being steered in either one of said two predetermined directions.

4. A heliostat apparatus as recited in claim 3, wherein the movement of each one of said plurality of expander portions is in a radial direction with respect to said fixed center point.

5. A heliostat apparatus as recited in claim 4, wherein said heliostat is rotated about said fixed center point when steered in either one of said two predetermined directions.

6. A heliostat apparatus as recited in claim 5, wherein said first drive means is adapted to displace at least two of said plurality of linkage means relative to a remaining ones of said plurality of linkage means to affect said steering of said heliostat in said first predetermined direction.

7. A heliostat apparatus as recited in claim 6, wherein each said heliostat is adapted to be steered in said first predetermined direction to effect elevational alignment, rotation and tracking of said heliostat.

8. A heliostat apparatus as recited in claim 5, wherein said first drive means is adapted to displace said heliostat relative to said plurality of linkage means to affect said steering of said heliostat in a second of said two predetermined directions.

9. A heliostat as recited in claim 8, wherein said heliostat is said steered in said second predetermined direction to effect azimuthal alignment, rotation and tracking of said heliostat.

10. A heliostat apparatus as recited in claim 1 further comprising: a second drive means operatively connected to said frame member to effect steering of said heliostat in a second of said two predetermined directions.

11. A heliostat apparatus as recited in claim 10, wherein each said heliostat is adapted to be steered in said second predetermined direction to effect azimuthal steering, aligning and tracking of said heliostat.

12. A heliostat apparatus as recited in claim 10, wherein each one of said expandable portions define peripheral ends, said peripheral ends being adapted to releasably and slidably engage said corresponding one of said linkage means, said expandable portions being further adapted to move relative to said inner portions of said frame in response to said steering of said heliostat so as to reduce said stress, and wherein said second drive means is adapted to move a first one of said plurality of peripheral portions of said expandable portions back and forth in a longitudinal direction along a corresponding one of said plurality of linkage means, to effect said steering in said second predetermined direction.

13. A heliostat apparatus as recited in claim 12, further comprising a switching means adapted to cause a second one of said plurality of peripheral ends of said expandable portions to releasably and lockingly engage a second corresponding one of said linkage means in response to said steering of said heliostat.

14. A heliostat apparatus as recited in claim 13, further comprising a pivotal means disposed at said second peripheral end, said pivotal means allowing pivotal movement of said heliostat thereabout to effect said steering in said second predetermined direction when said switching means locks said frame thereto.

15. An apparatus as recited in claim 14, wherein said first one of said linkage means and said second one of said linkage means are radially spaced from one another.

16. A heliostat as recited in claim 15, wherein said first drive means is an electric motor.

17. A heliostat apparatus as recited in claim 16, wherein said second drive means is an electric motor.

18. A heliostat apparatus as recited in claim 17, wherein said switching means is an electric solenoid.

19. A heliostat apparatus as recited in claim 18, wherein said plurality of linkage means comprises cables.

20. A heliostat apparatus as recited in claim 19, wherein at least one of said plurality of linkage means comprise an elongated, substantially rigid member, and the remaining ones of said plurality of linkage means comprise elongated, substantially flexible members.

21. A heliostat apparatus as recited in claim 20, wherein said flexible members comprise three cables and said rigid member is a rail.

22. A heliostat apparatus as recited in claim 1, wherein said enclosure structure comprises a house of a shape and size suitable for enclosing said at least one heliostat and at least one of first and second upright members.

23. A heliostat apparatus as recited in claim 1, wherein each said heliostat is adapted to be steered in said first predetermined direction to effect elevational steering, aligning and tracking of said heliostat.

24. A heliostat apparatus as recited in claim 1, wherein said first drive means is adapted to displace at least two of said linkage means relative to the remaining plurality of linkage means to effect said steering of said heliostat in said first predetermined direction.

25. A heliostat apparatus as recited in claim 24, wherein said displacement of said linkage means provides azimuthal alignment, rotation and tracking of said heliostat.

26. A heliostat apparatus as recited in claim 1, wherein said first drive means is adapted to displace each said heliostat relative to all said plurality of linkage means to effect said steering in said first predetermined direction.

27. An apparatus as recited in claim 26,, wherein said movement of said heliostat relative to said plurality of linkage means provides elevational alignment, rotation and tracking of said heliostat.

28. A heliostat apparatus as recited in claim 1, wherein said plurality of linkage means comprise cables.

29. A heliostat apparatus as recited in claim 1, wherein at least one of said plurality of linkage means comprises at least one elongated substantially rigid member, and the remaining ones of said plurality of linkage means comprise elongated substantially flexible members.

30. A heliostat apparatus having a plurality of spaced, steerable heliostats, said heliostats being suspended from a plurality of longitudinally extending linkage means, wherein the improvement comprises:

(a) first and second longitudinally spaced upright members for suspending said linkage means therebetween;

(b) storage means disposed adjacent one of said upright members for protecting said heliostats from weathering;

(c) a first and second drive means operatively connected to said first and second upright members, respectively, for displacing two first linkage means of said plurality of linkage means in order to effect steering of said heliostats in a first predetermined direction;

(d) a plurality of third drive means, each one of said plurality of third drive means being operatively disposed at corresponding ones of said plurality of heliostat members for displaciong said heliostats so as to effect steering thereof in a second predetermined direction;

(e) a plurality of frame members, each one of said frame members being adapted to support a corresponding one of said heliostats at inner portions thereof, each one of said frame members having a plurality of spaced, expandable end portions with each one of said expandable end portions being adapted to slidably engage a corresponding one of said plurality of linkage means, said plurality of expandable end portions being adapted to substantially reduce heliostat stress produced by said linkage means during said steering and to allow said corresponding heliostat to independently move along said linkage means in directions away from and toward said storage means in response to said steering;

(f) a plurality of switching means, each one of said switching means being associated with a first one of said plurality of expandable and portions of said frame members, each one of said switching means enabling said first ones of said plurality of associated expandable end portions to be releasably locked to a first corresponding one said linkage means in response to the displacement of said plurality of heliostats in said second predetermined direction, and wherein each said third drive means is further associated with a second one of said plurality of expandable end portions, each said third drive means being adapted to enable said second one of said expandable end portions to cause said frame member associated therewith to move to and fro in a longitudinal direction along a corresponding second one of said linkage means; and (g) a plurality of pivotal means, each one of said pivotal means being disposed at a corresponding one said second expandable end portion, each one of said pivotal means being adapted to allow pivotal movement of said associated heliostat thereabout to effect said steering when said switching means locks said first expandable end portion to said first one of said linkage means.

* * * * *